United States Patent [19]

Wint

[11] Patent Number: 4,616,234

[45] Date of Patent: Oct. 7, 1986

[54] SIMULTANEOUS PHASE DETECTION AND ADJUSTMENT OF MULTI-JET PRINTER

[75] Inventor: Robert L. Wint, Dayton, Ohio

[73] Assignee: Eastman Kodak Company, Rochester, N.Y.

[21] Appl. No.: 765,974

[22] Filed: Aug. 15, 1985

[51] Int. Cl.[4] .............................................. G01D 15/18

[52] U.S. Cl. ........................................ 346/75; 346/1.1

[58] Field of Search .................................... 346/1.1, 75

[56] References Cited

U.S. PATENT DOCUMENTS

| | | | |
|---|---|---|---|
| 3,298,030 | 1/1967 | Lewis et al. | 346/75 |
| 3,465,350 | 9/1969 | Keur et al. | 346/75 |
| 3,465,351 | 9/1969 | Keur et al. | 346/75 |
| 3,596,276 | 7/1971 | Lovelady et al. | 346/75 |
| 3,761,941 | 9/1973 | Robertson | 346/1 |
| 3,898,673 | 8/1975 | Haskell | 346/140 |
| 3,969,733 | 7/1976 | DeMoss et al. | 346/1 |
| 3,981,019 | 9/1976 | Fujimoto et al. | 346/75 |
| 3,999,188 | 12/1976 | Yamada | 346/75 |
| 4,129,875 | 12/1978 | Ito et al. | 346/75 |
| 4,358,775 | 11/1982 | Jinnai | 346/75 |
| 4,417,256 | 11/1983 | Fillmore et al. | 346/75 |

OTHER PUBLICATIONS

IBM Technical Disclosure Bulletin, vol. 22, No. 7, Dec. 1979, pp. 2666–2668.

*Primary Examiner*—E. A. Goldberg
*Assistant Examiner*—Gerald E. Preston
*Attorney, Agent, or Firm*—Thomas H. Close

[57] ABSTRACT

In a continuous multi-jet ink jet printing apparatus, it is a problem to accurately adjust the phase of a printing pulse with respect to the drop separation profile. The problem is solved according to the invention by generating a short sample pulse and applying the short sample pulse simultaneously to the drop charging electrodes of all the ink jets, shifting the phase of the short sample pulse with respect to the stimulation cycle, and monitoring the ink jets to determine the drop separation profile. The phase of the printing pulse is then adjusted to bracket the drop separation profile.

16 Claims, 13 Drawing Figures

SIMULTANEOUS PHASE DETECTION AND ADJUSTMENT OF MULTI-JET PRINTER

TECHNICAL FIELD

The present invention relates to continuous multi-jet ink jet printing and more specifically to a method and apparatus for detecting the phase of drop separation from an ink jet filament with respect to a periodic stimulation signal applied to the printing head of an ink jet printer, and for adjusting the phase of a printing pulse applied to a drop charging electrode in the ink jet printing head.

BACKGROUND ART

In a continuous ink jet printer, the continuous jet of ink is expelled from an orifice in a print head to form an ink jet. The ink jet is stimulated by a periodic disturbance applied to the print head to cause the ink jet to reliably break up into an evenly spaced series of drops. Generally, one drop per stimulation cycle detaches itself from the ink jet filament. The trajectories of the drops are controlled by inducing a charge in the conductive ink jet filament at the moment of drop separation by means of a charging electrode located near the point of drop separation. In a "binary" type ink jet printer, drops are either charged or not by applying voltage pulses to the charge electrodes. Charged drops are deflected into a catcher from which the ink is recirculated, and uncharged drops proceed to the ink receiving surface such as paper. In a multiple-deflection type ink jet printer, drops are charged to various levels by pulses of various voltage levels on the charge electrode. The variously charged drops are deflected along a corresponding plurality of trajectories depending upon the amount of charge imparted to the drop.

In such continuous ink jet printing apparatus, the term "phase" is used to describe the time relation between the instant of drop separation and the stimulation cycle. The term "phase" is also used to describe the time relation between the printing pulses applied to the charge electrode and the stimulation cycle.

There are many factors that affect the phase of drop separation from the ink jet filament. Among these factors are temperature, pressure, viscosity and surface tension of the ink, strength of the stimulation signal, and the shape and size of the orifice. Since any of these factors may change with time, it is desirable to provide a means for detecting the phase of drop separation, and for adjusting the phase of the printing pulses in response thereto. In continuous ink jet printing systems having a plurality of ink jets, this problem is compounded, since the phase of drop separation may vary slightly from jet to jet. Furthermore, in the event that the difference of phase between the individual ink jets in a multiple jet printer is greater than some predetermined amount, effective phasing for all the jets may not be possible. It is desirable therefore to detect this condition and generate an alarm signal that can be used to shut down the ink jet printer, or initiate an automatic maintenance cycle.

In prior art continuous ink jet printing apparatus, it is known to detect the phase of drop separation by applying a short charging pulse to the drop charging electrode, and phase shifting the charging pulse with respect to the stimulation cycle while measuring the charge induced on the ink drops. The phase at which the maximum charge is induced on the ink drops corresponds to the phase of drop separation. IBM Technical Disclosure Bulletin Vol. 22, No. 7, December 1979, discloses such a phase detection scheme for use with a method of detecting satellite drop formation. U.S. Pat. No. 4,417,256 issued Nov. 22, 1983 to Fillmore et al. describes the phase detection scheme in conjunction with apparatus for adjusting the amplitude of the stimulation signal. In the apparatus described therein, breakoff phase of the weakest driven and strongest driven ink jet filaments are measured at low stimulation power, and the stimulation power is increased until the measured breakoff phase for the two filaments (i.e. the weakest and strongest driven) is equal.

The breakoff phase of each ink jet is measured as a function of the time of flight of an ink drop, sensed by a wire located near the path of the charged drops. The charge induced in the wire by the passing drop is sensed.

When employed with an ink jet printing head of the type having a relatively large number of ink jets, (e.g. 64) the phase detection scheme proposed by Fillmore et al has the disadvantage of taking a relatively long time to execute, since the phase of each jet is measured individually. Furthermore, because of the relatively weak signal produced by the induced charge on the sensing wire as the charged drop passes, the phase detection scheme proposed by Fillmore et al has the disadvantage of having a relatively low signal to noise ratio.

It is an object of the present invention to provide method and apparatus for sensing the phase of ink drop separation that is free from these disadvantages.

In some types of ink jet printing apparatus, the amplitude of the stimulation signal is adjusted as a preset function of the sensed mechanical vibration of the ink jet head. See U.S. patent application Ser. No. 390,105 filed June 21, 1982 now continuation-in-part of Ser. No. 06/77,102 filed Sept. 17, 1985 in the name of Braun where a piezoelectric transducer generates a feedback signal for controlling the amplitude of stimulation. In the manufacture of the ink jet printing head, the optimum stimulation amplitude is determined, and in operation of the ink jet head a closed loop servo controls the stimulation amplitude. In this type of ink jet, the stimulation amplitude is not varied to adjust drop breakoff phase. nevertheless, it is desirable to adjust the phase of the charging signal so that optimal printing conditions are achieved.

It is another object of the present invention therefore, to provide a method and apparatus for detecting the phase of drop separation in a continuous multi-jet type ink jet printer for adjusting the phase of the printing pulses applied to the drop charging electrodes. Furthermore, if the difference in phase between the first drop to separate and the last drop to separate is too great, no single setting of the phase of the print pulse will result in a reliable operation. Therefore, it is a further object of the invention to provide a means for generating an alarm so that further printing can be halted in the event that the phase difference exceeds a predetermined maximum amount.

DISCLOSURE OF THE INVENTION

The objects of the present invention are achieved by generating a short sample pulse, and applying the short sample pulse simultaneously to all of the drop charge electrodes; shifting the phase of the short sample pulse with respect to the stimulation cycle; and monitoring the ink jet to determine the phase profile of the drop separation. The phase of the printing pulse is then adjusted to bracket the detected phase profile of drop separation.

The charge induced on the ink jet may be measured directly by means of an electrometer or other measuring device disposed in the path of the undeflected ink jets, or indirectly by measuring the deflection of the ink jets.

In a preferred embodiment of the invention, the phase detection method is practiced in a multi-jet continuous ink jet printer of the binary type. A low voltage short sample pulse, of insufficient magnitude for deflecting the ink jets into the ink catcher, is applied to the charge plate. The ink jets are directed onto an electrometer in a storage and startup station, where the ink jet current is measured. The ink jet current is measured as the phase of the low voltage short sample pulse is stepped through the stimulation cycle in increments, to detect the minimum and maximum drop separation phases. The phase of the printing pulse, which is relatively longer in duration than the sample pulse, is then set to bracket the minimum and maximum detected phases.

According to a further aspect of the present invention, the difference between the minimum and maximum drop separation phases, the so-called "phase defect", is checked against a predetermined maximum to determine whether reliable printing is possible, and if not, an alarm signal is generated to halt the printing process, or to initiate an automatic maintenance routine.

BRIEF DESCRIPTION OF THE DRAWINGS

The invention will be described with reference to the drawings wherein.

MODES OF CARRYING OUT THE INVENTION

Figure 1:
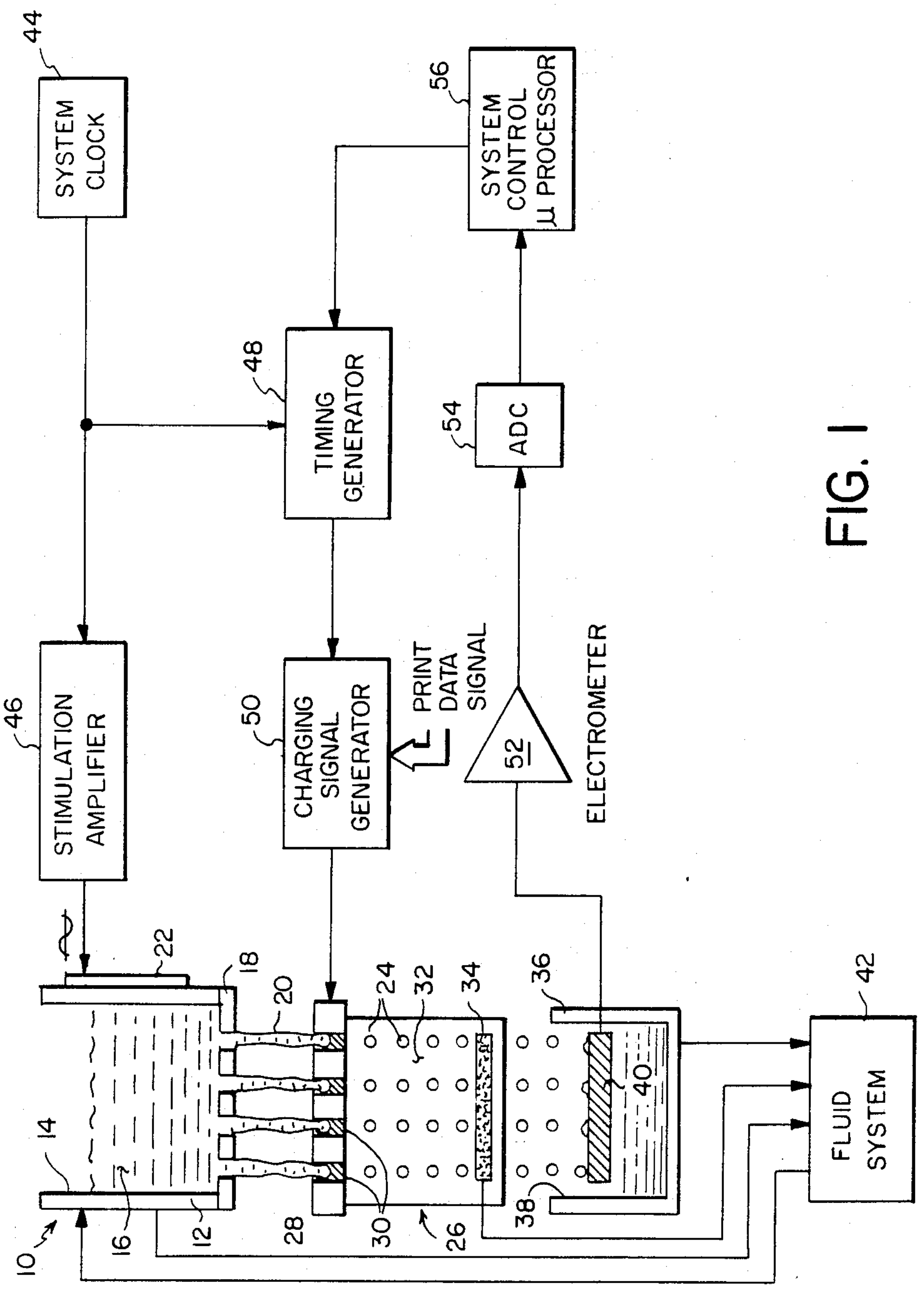
FIG. 1 is a schematic diagram of an ink jet printing apparatus for practicing a preferred embodiment of the present invention.

Referring to FIG. 1, a continuous binary multi-jet ink jet printing head is shown schematically along with associated electronics for practicing a preferred mode of the present invention. The printing head is of the type shown in U.S. patent application Ser. No. 390,105 filed June 21, 1982 now continuation-in-part of Ser. No. 06/77,102 filed Sept. 17, 1985 in the name of Braun. The ink jet printing head 10 includes an upper head portion 12 defining an ink reservoir 14 containing, under pressure, conductive ink 16. The pressurized ink is forced through an orifice plate 18 to produce ink filaments 20. A piezoelectric transducer 22 is mechanically coupled to the upper head portion 12 for inducing mechanical vibrations in the upper head portion and thereby stimulating controlled breakup of the ink filaments into drops 24. The ink jet printing head includes a lower portion 26 having a charging plate 28 with individually addressable electrodes 30 arranged adjacent each ink jet filament 20 for inducing charges on the ink drops 24 as they are separated from their respective ink filaments 20. Charged drops are deflected into the face of a drop catcher 32 where they are collected into an ink gutter 34 comprising a horizontal slot at the bottom of the drop catcher 32.

A nose cup 36 is provided at a storage and startup station (not shown) located at a suitable position within the ink jet printer. When the ink jet printing head 10 is not being used to print, it is positioned over the nose cup 36. The nose cup defines an ink sump 38 for receiving ink drops that are not sufficiently charged to be deflected into the drop catcher 32. An electrometer electrode 40 is located in the nose cup 36 in a position to receive the electrical charges carried by the ink drops entering the nose cup.

A fluid system 42, hydraulically connected to the print head 10 and nose cup 36, supplies the conductive ink under pressure to ink reservoir 14 in the upper head portion 12 of the printing head, and recirculates the ink from the ink gutter 34 in the lower portion 26 of the ink jet printing head, and the ink from the sump 38 in the nose cup 36.

The ink jet printer electronics includes a system clock 44 that supplies a periodic signal to a stimulation amplifier 46. The output of the stimulation amplifier is applied to the piezoelectric transducer 22 on the upper head portion 12 of the ink jet printing head 10. The periodic signal is also provided to a timing generator 48 for producing timing pulses that determine the phase and timing of the printing pulses that are applied to the electrodes 30 of charge plate 28. The timing pulses are supplied to a charging signal generator 50, that receives a digital print data signal during printing and generates the printing pulses that are applied to the electrodes 30 of charging plate 28. An electrometer 52 is connected to the electrometer electrode 40 and generates an analog signal that is proportional to the ink jet current incident on the electrometer electrode 40. The analog output signal of the electrometer is supplied to an analog-to-digital converter 54 to produce a digital signal indicative of the ink jet current sensed by the electrometer 52.

A system microprocessor 56 receives the digital ink jet current signal from the electrometer 52 and is programmed as described below, to control the timing generator to adjust the phase of the print pulses with respect to the phase of the ink drop separation.

Figure 2A:
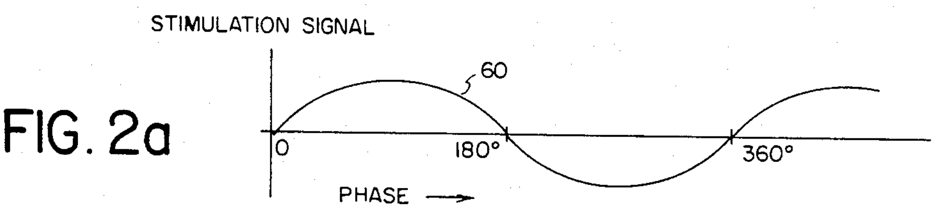
FIGS. 2*a*–2*e* are timing diagrams illustrating the general concept of the present invention.
Figure 2B:
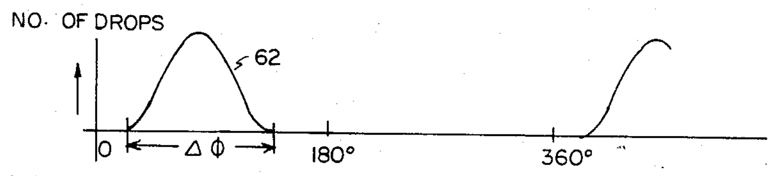
Figure 2C:
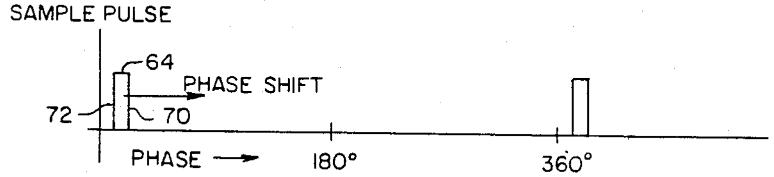
Figure 2D:
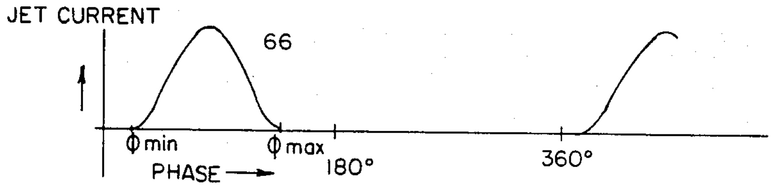
Figure 2E:
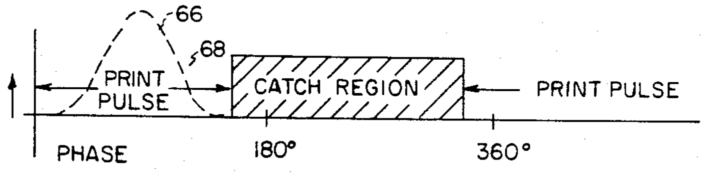

The general principle of operation of the present invention will now be described with reference to FIGS. 2*a*–2*e*. FIG. 2*a* shows a cycle of the constant frequency fixed amplitude stimulation signal 60 that is applied to the ink jet printing head to cause the drops to reliably break off from the ink jet filaments. Although the stimulation is effective to cause the drops to separate from the jets in synchronism, the drops do not all separate from the ink jets at exactly the same time. There is some spread in the time of separation, or what is equivalent, the phase of separation with respect to the stimulation signal. This spread is called the phase defect $\Delta\phi$. FIG. 2*b* shows a drop separation profile 62, indicating the relative numbers of drops that separate at a given phase. The width of the drop separation profile is the phase defect $\Delta\phi$. A narrow sample pulse 64, shown in FIG. 2*c*, is applied to the charge electrodes to charge only those drops that separate at the phase of the sample pulse. The phase of the sample pulse is shifted with respect to the stimulation signal while the ink jets are monitored to determine when droplets are being charged. In the type of ink jet printer shown in FIG. 1, the ink jet can be monitored by applying a low sample voltage to the ink jets, insufficient to cause the jets to be deflected into the catcher, with charge on the ink jets being monitored by the electrometer in the storage and startup station. Alternatively, the electrometer may be located in the catcher, and the sample pulse be of sufficiently high voltage to cause the drops charged by the sample pulse to be deflected into the catcher. A plot of the ink jet current 66 as measured by the electrometer is shown in FIG. *2d*. If a sufficiently narrow sample pulse is employed (e.g. about 2° ), the ink jet current profile 66, as shown in FIG. *2d*, will be an accurate image of the drop breakoff profile 62 (shown in FIG. *2b*). The phase of the print pulse 68 is then adjusted so that the print pulse brackets the jet current profile 66, as shown in FIG. *2e*.

If the drop breakoff profile is substantially symmetrical, or if the width of the print pulse is substantially greater than the width of the drop breakoff profile, the phase of the print pulse may simply be set to coincide with the peak of the drop breakoff profile. This may be of sufficient accuracy for a draft mode, where extreme accuracy of operation is not required. When greater accuracy is required, the minimum and maximum breakoff (φmin, φmax) phases can be detected, and the phase of the print pulse set to bracket them symmetrically.

The measured jet current profile will be broader than the width of the drop breakoff profile since the jet current profile is the correlation function of the drop breakoff profile and the sample pulse. If the sample pulse is relatively wide compared to the drop breakoff profile (e.g. about 10° ), the broadening effect on the jet current profile should be taken into account. If the middle of the sample pulse is taken as the phase reference for the jet current profile, the relative phase position of the jet current profile will be unaffected (both ends of the jet current profile will be broadened by an equal amount). If the leading edge 70 (see FIG. *2c*) of the sample pulse is employed as a phase reference, the jet current pulse will be broadened and phase delayed (shifted to the right as viewed in FIG. *2d*) by an amount equal to the width of the sample pulse. Conversely, if the trailing edge 72 of the sample pulse is employed as the phase reference, the jet current profile will be broadened as before, and advanced in phase (shifted to the left as seen in FIG. *2d*). This apparent phase shift may then be accounted for in adjusting the phase of the print pulse.

The sample pulse has been described in FIGS. *2c* and *2e* respectively as if it was a positive voltage pulse. In practice, the sample pulse may be a momentary excursion to zero volts from a non-zero voltage as is the case in a particular embodiment to be described with reference to FIGS. 3, *4a–4e* and 5.

Figure 3:
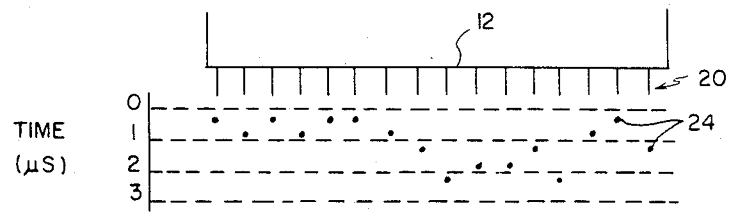
FIG. 3 is a schematic diagram illustrating the variation in drop separation times in a multi-jet continuous ink jet printer.

FIG. 3 schematically shows a portion of an ink jet printing head 12 of the type shown in FIG. 1, producing a plurality of ink jet filaments 20 (e.g. 64). A sinusoidal 75.1 KHz stimulation voltage, as shown in FIG. *4a*, is applied to the print head 12 to cause synchronized drop separation. The time scale in FIG. 3 graphically shows the time with respect to zero phase that each of the drops separates from its respective filament. In the particular type of ink jet printing head employed to reduce the present invention to practice, the drop breakoff profile was typified by most of the drops breaking off at some initial phase, and some drops breaking off later. As a result, all of the measured drop breakoff profiles, as shown typically in FIG. *4b*, were skewed to the left. All of the drop breakoff profiles were limited to several microseconds in total width, out of a 13.3 microsecond stimulation cycle. A 1 microsecond sample pulse comprising a 1 microsecond excursion to 0 volts from 50 volts, was employed as shown in FIG. *4c*. The 50 volt potential was too small to cause any charged drops to be deflected into the catcher, however, it was large enough to induce a measurable charge on the drops. The one microsecond sample pulse was phase shifted across the stimulation cycle in 64 increments of 5.625° (0.207 microseconds), while the jet current was monitored by the electrometer in the storage and startup station 36. The trailing edge of the sample pulse was employed as a phase reference to yield the jet current profile shown in FIG. *4d*. The jet current profile in FIG. *4d* is inverted with respect to the drop breakoff profile because the drops are charged in the absence of the sample pulse. As the sample pulse is phase shifted through the stimulation cycle, the jet current profile abruptly drops from a maximum value $I_{max}$ to a minimum value $I_{min}$, and then more slowly returns to the maximum value $I_{max}$.

The width of the 1 microsecond sample pulse is a significant fraction of the total width of the drop breakoff profile, which is several microseconds wide. This has the effect of broadening the jet current profile by 1 microsecond, and since the trailing edge of the sample pulse is employed as the phase reference, it also has the effect of advancing the phase (shifting the jet current profile to the left as shown in FIG. *4d*) by 1 microsecond. Since a majority of the drops break off early in the drop breakoff profile, the jet current reaches a minimum at the beginning of the drop breakoff profile, approximately 1 microsecond into the jet current profile. This minimum is readily detectable, and is used to establish the minimum phase $\phi_{min}$ of the beginning of the drop breakoff profile. The jet current returns to the maximum value Imax at the end of the drop breakoff profile, and the return to Imax is detected to establish the maximum phase $\phi_{max}$ of the end of the drop breakoff profile. The 8 microsecond print pulse, which comprises an excursion to 0 volts from a substantially higher voltage of 150 volts, is centered on the middle of the measured drop breakoff profile at a phase of $$\frac{\phi_{min} + \phi_{max}}{2}.$$

Alternatively, when less accuracy is required, such as in a draft mode, the print pulse is centered about the minimum phase $\phi_{min}$ at the minimum jet current.

Figure 4A:
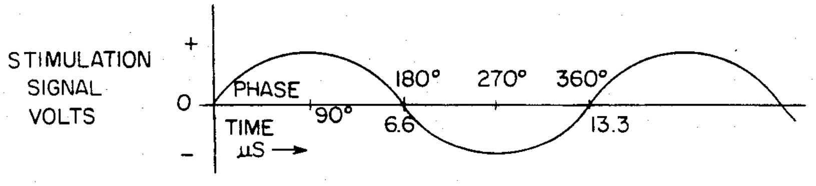
FIGS. 4*a*–4*e* are timing diagrams useful in describing the operation of the ink jet phase detection and adjustment apparatus and method according to a particular embodiment of the present invention.
Figure 4B:
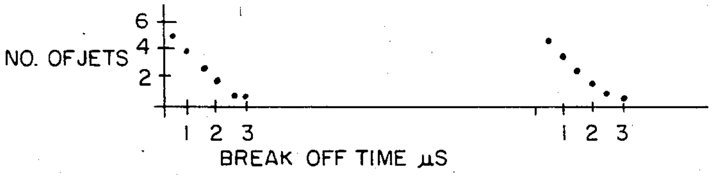
Figure 4C:
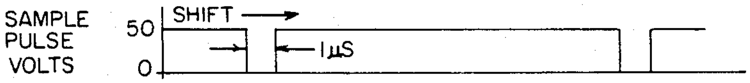
Figure 4D:
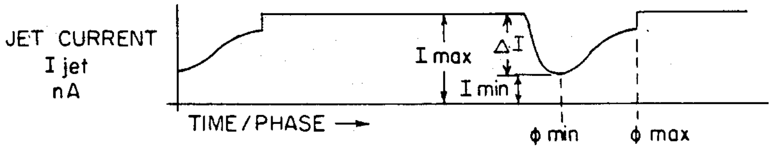
Figure 4E:
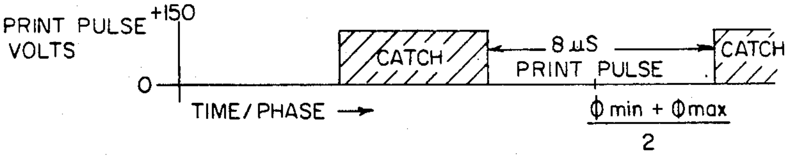
Figure 5:
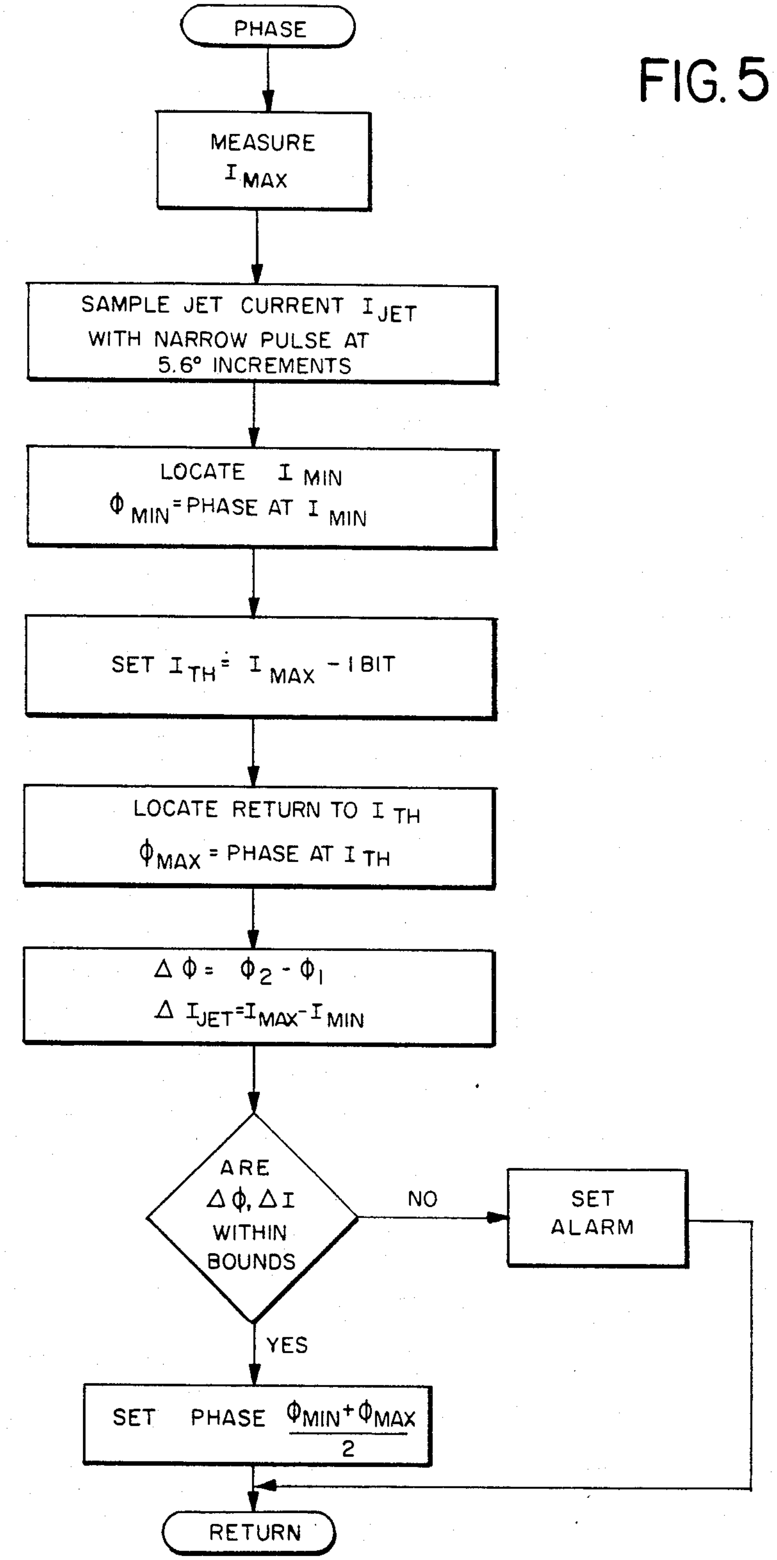
FIG. 5 is a flow chart illustrating the steps in performing the phase detection and adjustment method according to the present invention.

The system control microprocessor 56 is programmed as shown in FIG. 5 to perform the phase detection and phase adjustment functions. First the ink jet is operated over the storage and startup station with a constant 50 volts applied to the charge plate and the jet current is measured to determine $I_{max}$. In the reduction to practice, the jet current was measured for 5 seconds, taking 250 samples at 20 milisecond intervals, and the average current value was computed to determine $I_{max}$. Next, the narrow sample pulse shown in FIG. 4*c* was applied to the charge plate, and shifted through increasing values of $\phi$, starting at zero in increments of 5.625° through the stimulation cycle while monitoring the jet current. The minimum value $I_{min}$ of the jet current was noted, and the phase $\phi_{min}$ at the minimum value was recorded. A threshold current value $I_{th}$ was set by subtracting one count from $I_{max}$. The phase $\phi_{max}$ at which the jet current returned to $I_{th}$ was noted. The threshold value $I_{th}$ was used to determine the end of the drop breakoff profile rather than the maximum current $I_{max}$ to avoid uncertainty due to noise. The phase of the print pulse was then set to $$\frac{\phi_1 + \phi_2}{2}.$$

Optionally, some checks are made on the ink jet to determine if it is operating within acceptable limits. For example, the total phase defect $\Delta\phi$ defined as the width in phase of the drop breakoff profile is checked against predetermined constants to see if the phase defect lies within acceptable operating limits. For example, if the measured $\Delta\phi$ is less than a predetermined minimum possible avlue (e.g. 27° ), it is an indication that the measurement is faulty, and remedial measures are in order. If the measured $\Delta\phi$ is greater than some maximum allowable value (e.g. 125° ), it is an indication that the ink jet head is malfunctioning. The jet current may also be checked to determine whether it lies within acceptable operating limits.

If any of these checks are out of bounds, an alarm is set and the printer is put in a standby mode. Alternatively, the printer is automatically sent into a recovery cycle such as a head cleaning cycle as disclosed in U.S. patent application Ser. No. 495,183 filed May 16, 1983, now U.S. Pat. No. 4,563,688 in the name of Braun.

INDUSTRIAL APPLICABILITY AND ADVANTAGES

The method and apparatus for detecting and adjusting phase in a ink jet printer is useful in ink jet printing to automatically detect drop separation phase and adjust the charging phase of the ink jet printer. The method and apparatus is advantageous in that a more reliable phase determination can be made than by the methods of the prior art.

A further advantage is the speed with which the phase can be detected, resulting from the fact that all of the jets are monitored simultaneously. This is of particular advantage when the ink jet print head has a relatively large number of jets.

A still further advantage results from the increased signal-to-noise ratio achieved since all of the jets are measured simultaneously, and the ink jet current is monitored by direct contact with the charged ink jets.

I claim:

1. A method for detecting the phase of drop separation with respect to stimulation cycle in a continuous multi-jet with a plurality of charging electrodes ink jet printer, characterized by:

generating a short sample pulse and applying the sample pulse to all of the drop charging electrodes simultaneously;

shifting the phase of the sample pulse with respect to the stimulation cycle; and monitoring the ink jets to determine the drop separation profile.

2. The phase detection method of claim 1, wherein the monitoring step is characterized by sensing the deflection of the ink jets.

3. The phase detection method of claim 1, wherein the monitoring step is characterized by sensing the charge imparted to the ink jets.

4. A method for detecting the phase of drop separation and adjusting the phase of a printing pulse with respect to a stimulation cycle in a continuous multi-jet with a plurality of charging electrodes ink jet printer, characterized by:

generating a short sample pulse and applying the sample pulse to all of the drop charging electrodes simultaneously;

shifting the phase of the sample pulse with respect to the stimulation cycle;

monitoring the ink jets to detect the drop separation profile; and setting the phase of the printing pulse to bracket the drop separation profile.

5. The method of phase detection and adjustment claimed in claim 4, wherein the monitoring step is characterized by sensing the deflection of the ink jets.

6. The method of phase detection and adjustment claimed in claim 4, wherein the monitoring step is characterized by sensing the charge imparted to the ink jets.

7. The method of phase detection and adjustment claimed in claim 6, wherein the ink jet printer is of the binary type, charged ink jet drops being deflected to a catcher and uncharged drops being printed, the printing pulse being a pulse to zero volts from a relatively high charging voltage, the steps of generating a short sample pulse being characterized by the sampling pulse being a pulse to zero volts from some lower charging voltage of insufficient magnitude to deflect the charged drops to the catcher.

8. The method of phase detection and adjustment claimed in claim 7, wherein the step of monitoring the ink jet by sensing the charge imparted to the ink jet is characterized by:

sensing the ink jet current while the lower charge voltage is applied to the charging electrodes in the absence of a sample pulse to derive an average current value $I_{max}$;

sensing the ink jet current while phase shifting the narrow sample pulse with respect to the stimulation cycle; and locating the phase at which the ink jet current reaches a minimum to detect the minimum phase of drop separation and locating the phase at which the ink jet current returns to said average current after having reached the minimum to detect the maximum phase of drop separation.

9. The method of phase detection and adjustment claimed in claim 8, further comprising the step of:

calculating a phase defect equal to the value of the maximum phase minus the value of the minimum phase, and generating an error signal if the phase defect is greater than a predetermined value.

10. Apparatus for detecting the phase of drop separation with respect to a stimulation cycle in a continuous multi-jet with a plurality of charging electrodes ink jet printer, characterized by:

means for generating a short sample pulse, and applying the sample pulse to all of the drop charging electrodes simultaneously;

means for shifting the phase of the sample pulse with respect to the stimulation cycle; and means for sensing a physical property of the ink jets indicative of the phase of drop separation to detect the phase of drop separation.

11. The phase detecting apparatus claimed in claim 10, wherein said physical property of the ink jet is the charge carried by the ink, and wherein said means for sensing the physical property is an electrometer arranged to be impacted by the ink jet.

12. Apparatus for detecting the phase of drop separation and adjusting the phase of a printing pulse with respect to a stimulation cycle in a continuous multi-jet with a plurality of charging electrodes ink jet printer, characterized by:

means for generating a short sample pulse and applying the sample pulse to all of the drop charging electrodes simultaneously;

means for shifting the phase of the sample pulse with respect to the stimulation cycle;

means for sensing a physical property of the ink jets indicative of the phase of drop separation to detect the phase of separation; and means for setting the phase of the printing pulse equal to the detected phase of drop separation.

13. The phase detecting and adjusting apparatus claimed in claim 12, wherein said physical property of the ink jet is the charge carried by the ink jet, and wherein said means for sensing the physical property is an electrometer arranged to be impacted by the ink jet.

14. Apparatus for detecting the phase of drop separation and for adjusting the phase of a printing pulse with respect to the stimulation cycle in a multi-jet with a plurality of charging electrodes ink jet printer, characterized by:

means for generating a short sample pulse and applying the sample pulse to all of the drop charging electrodes;

means for shifting the phase of the sample pulse with respect to the stimulation cycle;

means responsive to the charge imparted to the ink jets by the sample pulse for detecting the minimum and maximum phase of drop separation; and means for setting the phase of the printing pulse midway between the minimum and maximum detected phases of drop separation.

15. The apparatus for detecting and adjusting phase claimed in claim 14, wherein the ink jet printer is of the binary type, charged ink drops being deflected to a catcher and uncharged drops being printed, the printing pulse being a pulse to zero volts from a relatively high charging voltage, the means for generating a sample pulse being characterized by generating a relatively short pulse to zero volts from a relatively lower charging voltage of insufficient magnitude to cause drops charged thereby to be deflected to the catcher; and means for detecting the maximum and minimum phase of drop separation being characterized by an electrode located in a storage and startup station to receive drops charged by the low charging voltage.

16. The apparatus for detecting and adjusting phase claimed in claim 15, further characterized by:

means responsive to the difference between the maximum and minimum detected phase of drop separation for generating an error signal if the phase difference exceeds a predetermined amount.

* * * * *